United States Patent [19]

Tjioe et al.

[11] Patent Number: 4,806,323

[45] Date of Patent: Feb. 21, 1989

[54] METHOD FOR THE REMOVAL OF CADMIUM FROM ACID PHOSPHATE-CONTAINING AQUEOUS MEDIA

[75] Inventors: Tjay T. Tjioe, Capelle aan de Ijssel; Simon Van Duijn, Noordwijk; Paul Wey, Den Haag, all of Netherlands

[73] Assignee: Stamicarbon B.V., Geleen, Netherlands

[21] Appl. No.: 43,961

[22] Filed: Apr. 29, 1987

[30] Foreign Application Priority Data

Apr. 29, 1986 [NL] Netherlands ................. 8601101

[51] Int. Cl.$^4$ ............... C01B 25/235; C01G 11/00; C22B 17/04
[52] U.S. Cl. .................. 423/321 R; 423/100; 423/162; 75/101 BE; 75/121; 210/688
[58] Field of Search ............. 210/688; 423/321 R, 423/321 S, 100, 162; 75/101 BE, 121

[56] References Cited

U.S. PATENT DOCUMENTS

| | | | |
|---|---|---|---|
| 3,306,702 | 2/1967 | Odland et al. | 423/321 R |
| 4,154,805 | 5/1979 | Hiraga et al. | 423/321 S |
| 4,492,680 | 1/1985 | Frankenfeld et al. | 423/321 S |

FOREIGN PATENT DOCUMENTS 0161315  8/1985  Japan ........................ 423/321 S

OTHER PUBLICATIONS

Herve, D., "Ion Exchangers in Hydrometallurgy", Industrie Minerale, France, No. 3, 1977 (Rough Draft Translation).

Primary Examiner—Robert L. Stoll
Attorney, Agent, or Firm—Cushman, Darby & Cushman

[57] ABSTRACT

Cadmium is removed from an acid, phosphate-containing aqueous medium with the aid of an anion exchanger, in which process, during the removal, iodide or bromide ions are present in a quantity of 100–6000 ppm calculated with respect to the acid phosphate-containing aqueous medium.

7 Claims, No Drawings

METHOD FOR THE REMOVAL OF CADMIUM FROM ACID PHOSPHATE-CONTAINING AQUEOUS MEDIA

The invention concerns a method for the removal of cadmium from an acid phosphate-containing aqueous medium, with the aid of an anion exchanger.

The German Auslegeschrift No. 2748279 describes a method for the preparation of highly pure phosphoric acid in which the crude phosphoric acid obtained from a wet phosphoric acid process is first purified by means of extraction, upon which zinc and any other heavy metals are removed in an anion exchanger, in the presence of chloride ions in a relatively high concentration of 10–60 g/l.

In this process the heavy metals are removed together with zinc from a phosphoric acid solution after this solution has been purified in an extraction step.

The invention now provides a method by which cadmium is selectively removed from acid phosphate-containing aqueous media in only one step.

According to the invention, this is achieved because iodide or bromide ions are present in a quantity of 100–6000 ppm calculated with respect to the acid phosphate-containing aqueous medium.

It appears that, with the aid of an anion exchanger, in the presence of a small quantity of iodide or bromide ions almost all of the cadmium is selectively removed from the acid phosphate-containing aqueous medium.

In prinicple, it is possible to remove cadmium from any acid phosphate-containing aqueous medium, e.g. crude phosphoric acid, using this method. The temperature of the medium may vary between wide limits. In the wet phosphoric acid process the temperatures generally range from room temperature to approximately 130° C. The medium may contain excess Ca ions as well as excess sulphate ions. The concentration of phosphate in the medium does not materially affect the application of the method either.

However, in the wet phosphoric acid process cadmium is preferably removed before calcium sulphate, to be drawn off as a by-product, is formed, because then practically cadmium-free phosphoric acid as well as practically cadmium-free calcium sulphate is obtained. This has particular advantages for the technical application of calcium sulphate, for example in the building industry, since the presence of poisonous heavy metals forms a serious obstacle there.

If the phosphate rock is digested with a solution containing nitric acid or phosphoric acid, cadmium can be removed from the nitro-phosphate solution or monocalcium solution formed in the digestion of the phosphate rock.

In addition, the method under consideration can be profitably applied to a nitro-phosphate method in which phosphate rock is digested with nitric acid and the calcium present in the phosphate rock is removed in the form of calcium nitrate crystals obtained by cooling the resulting digestion liquor. Since, as is known, cadmium is hardly or not at all incorporated in the calcium nitrate crystals, in this process practically all the cadmium can be removed by applying the method under consideration to the nitro-phosphate solution after the calcium has been removed in the form of calcium nitrate crystals.

A strong basis anion exchanger, e.g. of the type $PS-CH_2N(CH_3)_3^+$, or a weak basic anion exchanger, e.g. of the type $PS-CH_2N(CH_3)_2$, or a very weak basic anion exchanger, e.g, of the type $PS-C_6H_4NH_2$, in which PS in each case represents a cross-linked polystyrene, may all be used as an anion exchanger.

The quantity of iodide or bromide calculated with respect to the acid phosphate-containing aqueous medium should amount to 100–6000 ppm. Preferably, 100–2000 ppm iodide or 300 to 6000 ppm bromide is used.

The iodide or bromide ions can be added to the aqueous medium. It is however also possible to preload the ion exchanger with iodide or bromide or to apply a combination of both forms of iodide or bromide addition.

In order to restrict the loss of iodide or bromide to a minimun, the iodide or bromide ions remaining in the acid phosphate-containing aqueous medium after the removal of cadmium are preferably removed from this medium. It has appeared that these iodide or bromide ions are easily removed from the medium with the aid of the same type of anion exchanger as are used for the removal of cadmium. This anion exchanger loaded with iodide or bromide can then be profitably used for the removal of cadmium.

The invention will now be illustrated with the examples.

EXAMPLE 1

A strong basis anion exchanger (Dowex MSA-1) was converted into the phosphate form with 0.5 M $KH_2PO_4$ and subsequently kept for at least 10 hours at 90° C. in 55–65 % phosphoric acid. Of the anion exchanger thus pre-treated 3 grams (0.9 grams dry) were added to 100 grams of 55 % technical grade phosphoric acid of 90° C., containing 29 ppm of cadmium. In addition, 2.00 ml of 10 % HBr (2000 ppm in solution) was added. After stirring for 1.5 hours and upon separation of the ion exchanger, the cadmium concentration in the liquid phase amounted to 1.5 ppm.

This experiment was conducted in an atmosphere of nitrogen to avoid oxidation of $Br^-$ into $Br_2$ and subsequent escaping of $Br_2$.

EXAMPLE 2

To 100 grams of 55 % technical grade phosphoric acid of 90° C. containing 59 ppm of cadmium 3.0 grams of a strong basic anion exchanger (Dowed MSA-1) pretreated in the same manner as in example 1 and 0.10 grams of KI was added. After 2 hours the cadmium concentration in the liquid phase amounted to 3.5 ppm.

This experiment was also conducted in an atmosphere of nitrogen since $I^-$ is even more senstivie to oxidation than $Br^-$.

EXAMPLE 3

150 grams of 65 % technical grade phosphoric acid of 90° C., containing 29 ppm of cadmium, was made reducing by adding 0.15 grams of Zn. The cadmium was recovered with 5.0 grams (1.6 grams dry) of the same pretreated anion exchanger as in examples 1 and 2. In addition, 0.15 grams of KI were added. After 2 hours the cadmium concentration in the liquid phase amounted to 3.5 ppm. The oxidation of $I^-$ was in this example slowed down by the addition of Zn, producing a more reducing environment.

We claim:

1. Method for the removal of cadmium from an acid, phosphate-containing aqueous medium which comprises contacting the acid, phosphate-containing aqueous medium containing cadmium with an anion exchanger characterized in that, during the contacting, iodide or bromide ions are present in a quantity of 100–6000 ppm in the acid-phosphate-containing medium.

2. Method in accordance with claim 1, characterized in that, during the removal, iodide ions are present in a quantity of 100–2000 ppm of the acid phosphate-containing aqueous medium.

3. Method in accordance with claim 1, characterized in that, during the removal, bromide ions are present in a quantity of 300–6000 ppm of the acid phosphate-containing aqueous solution.

4. Method in accordance with claim 1, characterized in that the acid phosphate-containing aqueous medium is obtained as a result of the digestion of phosphate rock with a mineral acid.

5. Method in accordance with claim 1, characterized in that the acid phosphate-containing aqueous medium is a nitrophosphate solution containing calcium obtained as a result of the digestion of phosphate rock with a solution containing nitric acid and the calcium present in the phosphate rock is removed as calcium nitrate crystals, formed by cooling.

6. Method in accordance with claim 1, characterized in that the bromide or iodide ions remaining in the acid phosphate-containing medium after the removal of cadmium are removed from this medium with the aid of an anion exchanger.

7. Method in accordance with claim 1, characterized in that an anion exchanger loaded as described in claim 6 is used to remove the cadmium.

* * * * *